United States Patent [19]

Stephenson et al.

[11] Patent Number: 4,805,927
[45] Date of Patent: Feb. 21, 1989

[54] HITCH ADAPTER FOR USE IN CONNECTING SEMI-INTEGRAL, PTO-DRIVEN IMPLEMENTS TO TRACTOR THREE-POINT HITCH

[75] Inventors: Roger D. Stephenson, Bloomfield; James C. Walters; Craig A. Richardson, both of Ottumwa, all of Iowa

[73] Assignee: Deere & Company, Moline, Ill.

[21] Appl. No.: 123,427

[22] Filed: Nov. 20, 1987

[51] Int. Cl.$^4$ ............................................. A01B 59/00
[52] U.S. Cl. .......................................... 172/47; 172/47; 172/272; 180/14.4; 180/53.1; 280/475; 280/490.1
[58] Field of Search ............... 180/53.1, 53.3, 14.4; 280/456 A, 460 A, 461 A, 475, 490 A, 490 R, 400; 172/47, 272, 273, 274, 439, 443, 451

[56] References Cited

U.S. PATENT DOCUMENTS

| | | | |
|---|---|---|---|
| 2,462,588 | 2/1949 | Wondra | 180/53.3 X |
| 3,450,220 | 6/1969 | Frandsen et al. | 180/53.1 X |
| 3,961,812 | 6/1976 | Von Allworden | 280/456 A X |
| 4,090,725 | 5/1978 | Périn | 280/461 A X |
| 4,210,209 | 7/1980 | van der Lely | 172/47 |
| 4,549,744 | 10/1985 | Herr et al. | 172/272 X |
| 4,738,461 | 4/1988 | Stephenson et al. | 280/400 |

Primary Examiner—David M. Mitchell
Assistant Examiner—Charles R. Watts

[57] ABSTRACT

A hitch adapter couples a semi-integral, PTO-driven implement to a quick coupler carried by a tractor three-point hitch. The hitch adapter includes a drawbar located significantly below the level of the connection of lower three-point hitch link with the quick coupler and a parking stand is integral with the bottom of the drawbar. Lowering of the three-point hitch from a normal working position results in the stand engaging the ground to prevent interference between the hitch and the drive shaft coupling the implement to the tractor PTO shaft. Once the stand engages the ground, the hitch adapter can be disconnected from the quick coupler hooks by releasing latches associated with the lower hooks and lowering the three-point hitch.

2 Claims, 2 Drawing Sheets

HITCH ADAPTER FOR USE IN CONNECTING SEMI-INTEGRAL, PTO-DRIVEN IMPLEMENTS TO TRACTOR THREE-POINT HITCH

BACKGROUND OF THE INVENTION

The present invention relates to hitch structures for a semiintegrally integrtally mounting a power take-off (PTO) driven implement to a tractor three-point hitch and more specifically relates to hitch adapters embodied in such structures.

When a PTO-driven implement is semi-integrally mounted to the three-point hitch of a tractor, the power shaft coupling the tractor PTO shaft to the implement transmission extends beneath the upper link of the three-point hitch. In the past, such hitch arrangements have had the disadvantage that interference between the power shaft and the upper link of, or a quick coupler carried by, the three-point hitch could result when the hitch approached the lower extreme of its movement In U.S. Pat. Nos. 4,366,877 and 4,525,987, this problem is avoided by using a hitch arrangement which eliminates the upper link of the three-point hitch and avoids the use of other structure located in the area above the power shaft. This solution to the problem is not entirely satisfactory, however, since the elimination of the top link for support results in increased bending moments being induced in the structure, in this case the implement drive housing, coupled to the three-point hitch lower links.

In co-pending U.S. patent application Ser. No. 927,467 filed 6 November 1986, which application was continued as application Ser. No. 088,501 filed Aug. 19, 1987 that issued as U.S. Pat. No. 4,738,461 on Apr. 19, 1988, the problem is avoided, in a structure including a hitch adapter carried at the rear of a three-point hitch and having a drawbar coupled to the implement tongue, by providing the hitch adapter with a stop bar that engages the tractor drawbar to prevent the three-point hitch from lowering beyond a predetermined point. This structure is effective to prevent interference between the three-point hitch and the power shaft but has the disadvantage that the stop bar makes it difficult to lower the three-point hitch to disengage a quick coupler from the hitch adapter.

SUMMARY OF THE INVENTION

According to the present invention there is provided an improved hitch adapter for use in sem-integrally mounting a PTO driven implement to a tractor three-point hitch or quick coupler carried by the hitch.

An object of the invention is to provide a hitch adapter constructed so as to prevent interference from occurring between a three-point hitch or quick coupler carried thereby and a power shaft coupled to the tractor PTO shaft.

A more specific object is to provide a hitch adapter having lower points of connection so located relative to the bottom of the hitch adapter that the latter engages the ground before the three-point hitch reaches a lowered position wherein the hitch or a quick coupler carried thereby can interfere with the power shaft coupled between the tractor and the implement.

Yet another object is to provide a hitch adapter which, when disconnected from the tractor three-point hitch, serves as a support stand for an implement coupled to a drawbar forming part of the hitch adapter.

Still another object is to provide a hitch adapter which, after being lowered onto ground contact, can be easily disconnected from a quick coupler by releasing latches associated with the lower quick coupler hooks and lowering the tractor three-point hitch.

These and other objects, features and advantages of the present invention will become apparent to those skilled in the art from the description which follows and from the drawings.

DESCRIPTION OF THE PREFERRED EMBODIMENT

Figure 1:
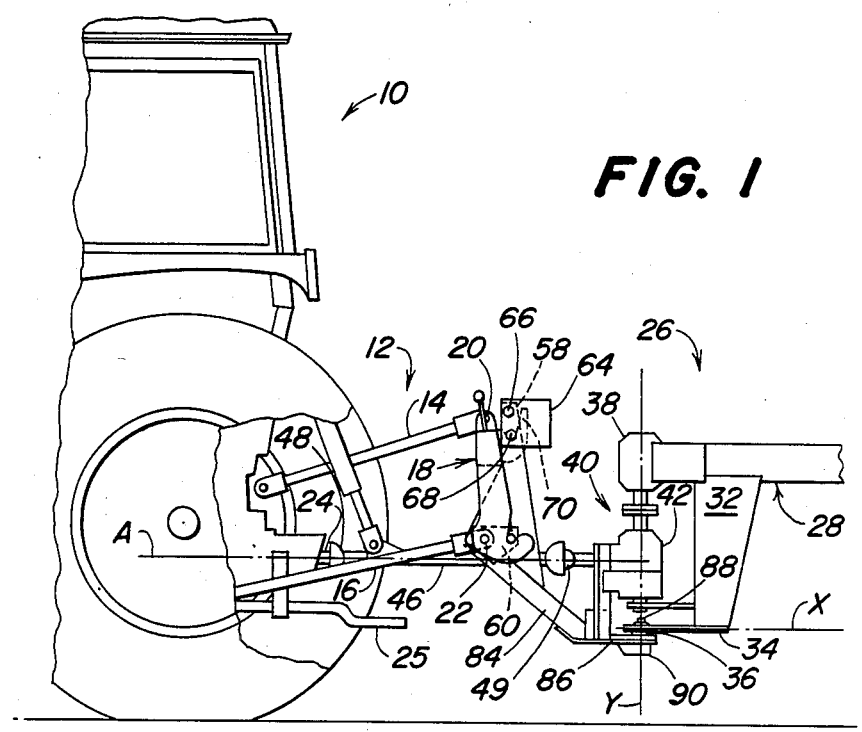
FIG. 1 is a left side elevational view showing a PTO-driven implement semi-integrally mounted to a tractor three-point hitch by a hitch adapter coupled to a quick coupler carried by the three-point hitch and constructed in accordance with the principles of the present invention.

Referring now to the drawings, there is shown a rear portion of a tractor 10 provided with a three-point hitch 12 including an upper link 14 and a pair of lower links 16. A quick coupler 18 defined by an inverted, U-shaped framework is pivotally coupled to the rear end of the upper link 14 by a pin 20 and to the rear ends of the lower links 16 by a pair of pins 22. The tractor 10 also includes a power take-off or PTO shaft 24 and a drawbar 25 located below tue shaft. Also shown is a forward end portion of an agricultural implement 26 semi-integrally mounted to the tractor and including components (not shown) adapted for being driven by the tractor PTO shaft 24.

Specifically, the implement 26 includes a forwardly extending tongue 28 defined by a box beam 30 having a hitch member 32 depending therefrom and including, at its bottom end, a forwardly extending hitch structure 34 carrying a ball connector 36. An upper gearbox or housing 38 of a transmission assembly 40 is fixed to the forward end of the beam 30 and supports a lower gearbox or housing 42 for rotation about an upright axis Y which passes through the ball connector 36 and is vertical when the tongue is held in an elevated, normal working position, as shown in FIG. 1. An input shaft 44 of the transmission assembly 40 is supported in the lower gearbox 42 and is coupled to the PTO shaft 24 by a telescopic drive shaft or line 46 having front and rear universal joints 48 and 49 for permitting relative movement between the tractor 10 and implement 26. The drive shaft 46 is preferably located in a common horizontal plane, indicated at A, with the PTO and gearbox input shafts when the tongue is in its normal working position and the tractor and implement are working on a level surface.

Figure 2:
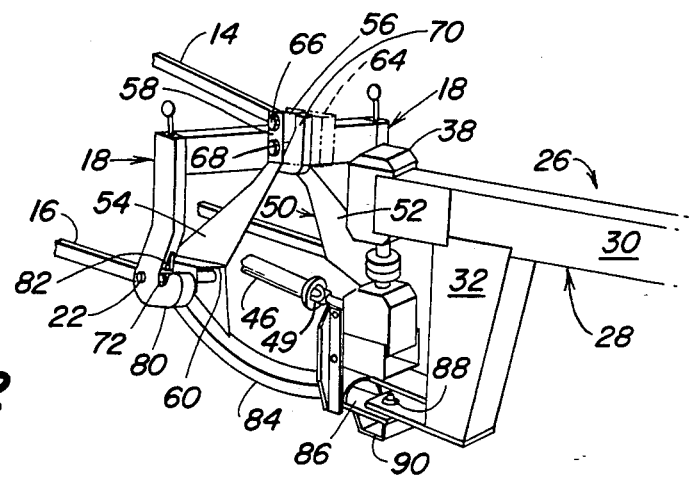
FIG. 2 is a left rear perspective view of the quick coupler and hitch adapter shown in FIG. 1 but with the hitch adapter channel member omitted.
Figure 3:
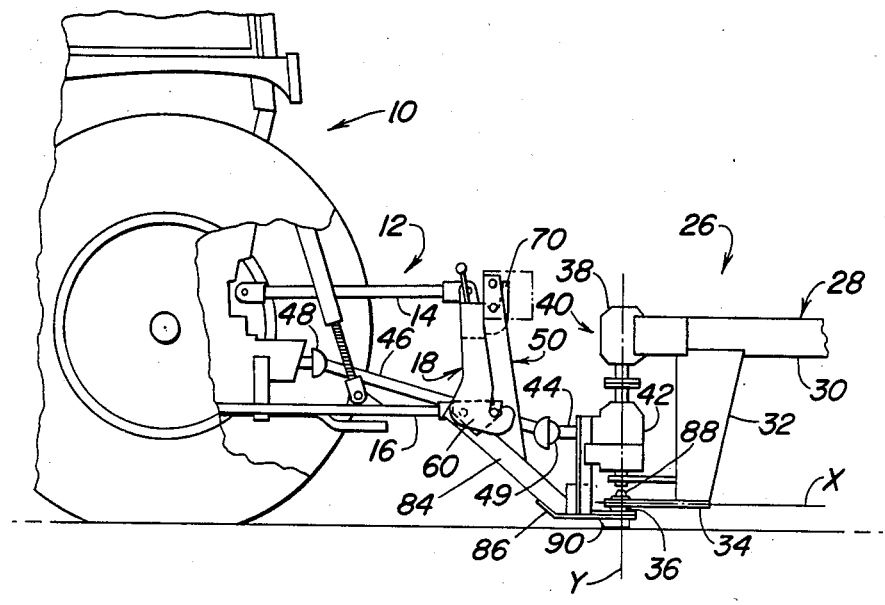
FIG. 3 is a view like that of FIG. 1 but showing the hitch adapter lowered into ground contact.

A hitch adapter 50 is coupled between the quick coupler 18 and implement hitch structure 34. Specifically, the hitch adapter 50 includes an upright mast structure defined by right and left legs 52 and 54 respectively having central, downwardly diverging portions extending between and joining upper parallel upright portions 56 and 58 and lower parallel upright portions 60, the latter portions defining downwardly, opening channels. A U-shaped channel member 64, which is shown in a rearwardly extending stored position in FIGS. 1 and 3, is located between and is releasably secured to the upper leg portions 56 and 58 by upper and lower fastener means 66 and 68, respectively, the lower means 68 being in the form of a cross pin which is received in an upwardly opening upper hook 70 of the quick coupler 18. The channel member 64 has openings permitting it to be mounted in an operative forwardly extending position for permitting the hitch adapter 50 to be coupled directly to the three point hitch 12. When a quick hatch is used, the channel member 64 may be omitted as shown in FIG. 2. Cross pins 72 located in the lower leg portions 60 are received in upwardly opening lower hooks 80 of the quick coupler 18. Latch members 82 releasably retain the pins 72 in the lower hooks. A bowed hitch or cross member 84 has its opposite ends fixed to bottoms of the legs 52 and 54 and extends downwardly and rearwardly therefrom. A drawbar 86 is fixed to and extends rearwardly from a lower central portion of the hitch 84 at a level which is significantly below that of the pins 22 coupling the lower three-point hitch links 16 to the quick coupler 18 and is commensurate with the level of the tractor drawbar 25 when the implement tongue 28 is in its normal working position. An upright stud 88 is carried at the rear of the drawbar 86 and is received in the implement hitch ball connector 36 and thus establishes the connection between the implement and quick coupler. It is here noted that when the three-point hitch 12 is holding the implement tongue 28 at its normal working position, the three-point hitch will be just below its upper extreme of movement so that the tongue may be raised slightly to give additional ground clearance when needed, but not so far as to result in the angles of the front and rear U-joints 48 and 49 becoming mismatched to the extent that damage to the drive shaft 44 and other driven elements results.

A parking stand 90 is fixed to the bottom of the drawbar 86 and is located such that, when the three-point hitch is operated to lower the tongue 28 from its normal working position, the stand will contact the ground and stop the three-point hitch from lowering to the extent that the upper link, the upper portions of the quick coupler 18 or the hitch adapter interfere with the drive shaft 46, or shielding normally associated therewith.

Further, the parking stand 90 engages the ground prior to the lower three-point hitch links 16 reaching their lower extreme positions so that, with the stand in ground engagement, the hitch adapter 50 may be disconnected from the quick coupler 18 by releasing the latches 82 associated with the lower hooks 80 and lowering the three-point hitch a distance sufficient for disengaging the hooks 70 and 80, respectively, from the pins 68 and 72.

It is to be understood that the hitch adapter 50 can be connected directly to the rear ends of the three-point hitch links in which case it will still function to prevent interference between the upper link and the drive shaft and associated shielding.

The operation of the hitch adapter 50 is thought to be apparent from the foregoing description. In brief summary it will be appreciated that the hitch adapter design has the following features:

1. The hitch adapter 50 is dimensioned to rest on the ground before interference with the drive shaft 46 can occur.

2. The hitch adapter 50 is supported by all three links of the three-point hitch 12 thus resulting in a large reduction in bending moments being induced therein as compared to a structure supported only by the lower three-point hitch links.

3. The hitch adapter configuration is such that the three-point hitch is already close to its upper extreme of movement when the implement tongue is held in its normal working position whereby movement of the three-point hitch to its upper extreme will not result in damage to the drive line 46 due to the angles of the front and rear U-joints 48 and 49 being mismatched.

4. The hitch adapter configuration is such that it will engage the ground before the three-point hitch 12 reaches the lower extreme of its movement, thus permitting the hitch adapter 50 to be disengaged from the quick coupler 18 by releasing the lower hook latches 82 and lowering the three-point hitch, the hitch adapter 50 then serving to support the implement tongue 28.

We claim:

1. In a combination including a tractor hitch structure having an upper central portion and transversely spaced lower side portions and including a three-point hitch defined by a central upper link and a pair of lower links and being swingable vertically between upper and lower extremes, a hitch adapter carried by the hitch structure and including a centrally located drawbar, a semi-integrally mounted implement having a tongue coupled to the drawbar for articulation about an upright axis, and a drive shaft universally coupled at its opposite ends to a tractor power take-off shaft and to an input shaft of a transmission housing located above the drawbar and carried by the implement tongue for pivoting about said axis, the improvement comprising: said hitch adapter including an upper central portion connected to the upper central portion of the hitch structure, a pair of legs diverging downwardly from the upper central portion and terminating at opposite side portions connected to the transversely spaced lower side portions of the hitch structure and a cross member extending between and having opposite ends joined with said opposite side portions and including a central portion disposed downwardly and rearwardly from the opposite ends thereof and supporting said drawbar; said drawbar being located relative to the hitch structure so that the drawbar and drive shaft are both disposed substantially horizontally when the hitch structure is positioned adjacent its upper extreme, the implement tongue then being held at a normal working height and the drawbar further being at an elevation below that of the hitch structure for engaging the ground, when the hitch structrue is lowered for lowering the implement tongue below its normal working height, before the hitch structure comes into contact with the drive shaft.

2. The combination defined in claim 1 wherein said hitch structure includes a quick coupler connected to the three-point hitch links and including a central upwardly opening top hook engaged with an upper pin carried in a central top portion of the hitch adapter and including a lower pair of upwardly opening hooks engaged with respective lower pins carried in opposite side portions of the hitch adapter and said drawbar being located so as to engage the ground and support the implement tongue before the three-point hitch reaches its lower extreme and such that once the drive shaft is disconnected the three-point hitch may be lowered a further distance sufficient for disengaging the quick coupler from the hitch adapter whereby the hitch adapter serves as a parking stand.

* * * * *